N. J. DAYSH.
MILKING MACHINERY.
APPLICATION FILED FEB. 3, 1917.

1,255,141.

Patented Feb. 5, 1918.
2 SHEETS—SHEET 1.

WITNESS:
Rob. R. Kitchel.

INVENTOR
Norman J. Daysh
BY
Frank D. Busser
ATTORNEY.

UNITED STATES PATENT OFFICE.

NORMAN JOHN DAYSH, OF POUGHKEEPSIE, NEW YORK, ASSIGNOR TO THE DE LAVAL SEPARATOR COMPANY, A CORPORATION OF NEW JERSEY.

MILKING MACHINERY.

1,255,141.  Specification of Letters Patent.  Patented Feb. 5, 1918.

Application filed February 3, 1917. Serial No. 146,383.

*To all whom it may concern:*

Be it known that I, NORMAN JOHN DAYSH, a subject of the King of Great Britain, residing at Poughkeepsie, county of Dutchess, and State of New York, have invented a new and useful Improvement in Milking Machinery, of which the following is a full, clear, and exact description, reference being had to the accompanying drawings, which form a part of this specification.

My invention relates to milking machines of the type in which pneumatic pulsations are used to obtain milk from a cow, and particularly to that type of milking machine in which double-chambered teat cups are used and in which suction, preferably continuous, is applied to the inner teat cup chambers and in which pneumatic pulsations are applied to the outer teat cup chamber. The object of my invention is to improve and render more certain the operation and also to reduce the power required to operate a large number of machines by the substitution, to a greater or less degree, of mechanical means for the pneumatic means which heretofore, in the specific type of machine to which my invention is more particularly applicable, has been relied upon to control the pulsator valve located adjacent to the teat cups and usually in a claw through which both the milk and pulsation passages are arranged to extend.

Figure 1:
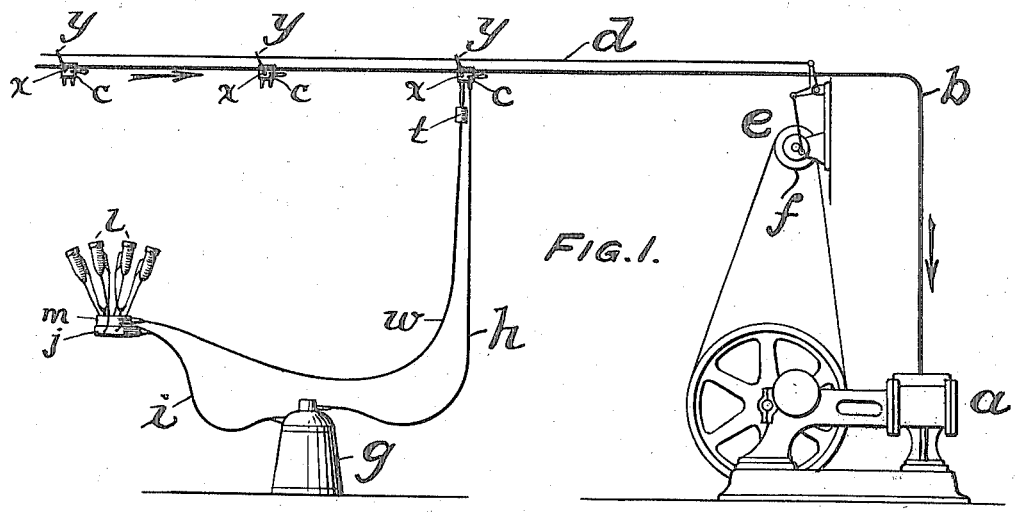
Figure 2:
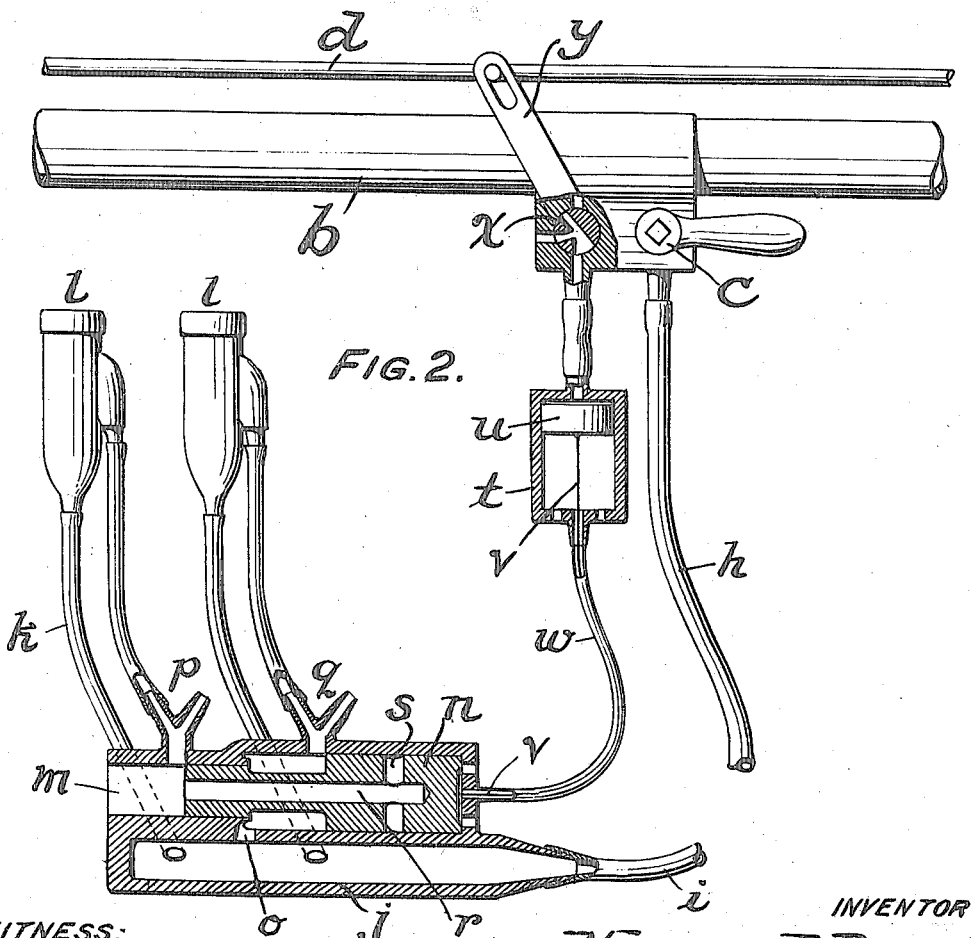
Figure 4:
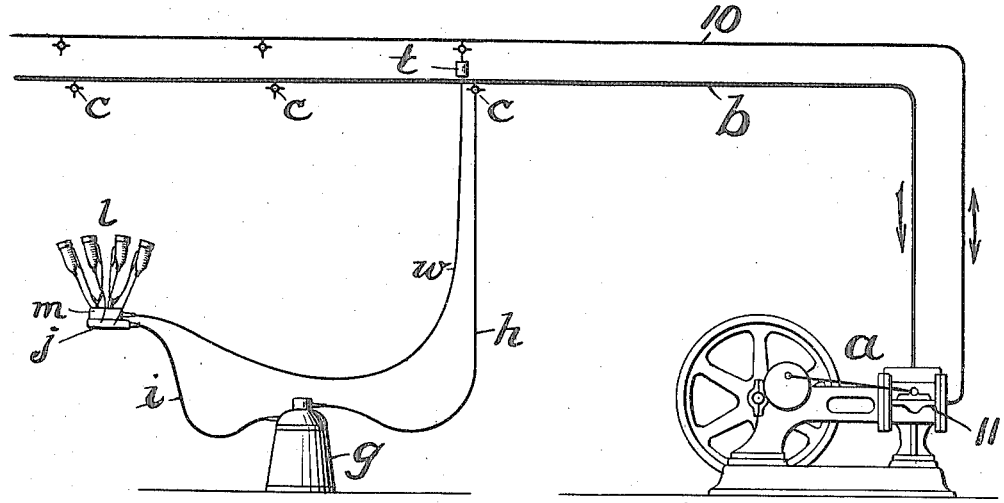
Figure 3:
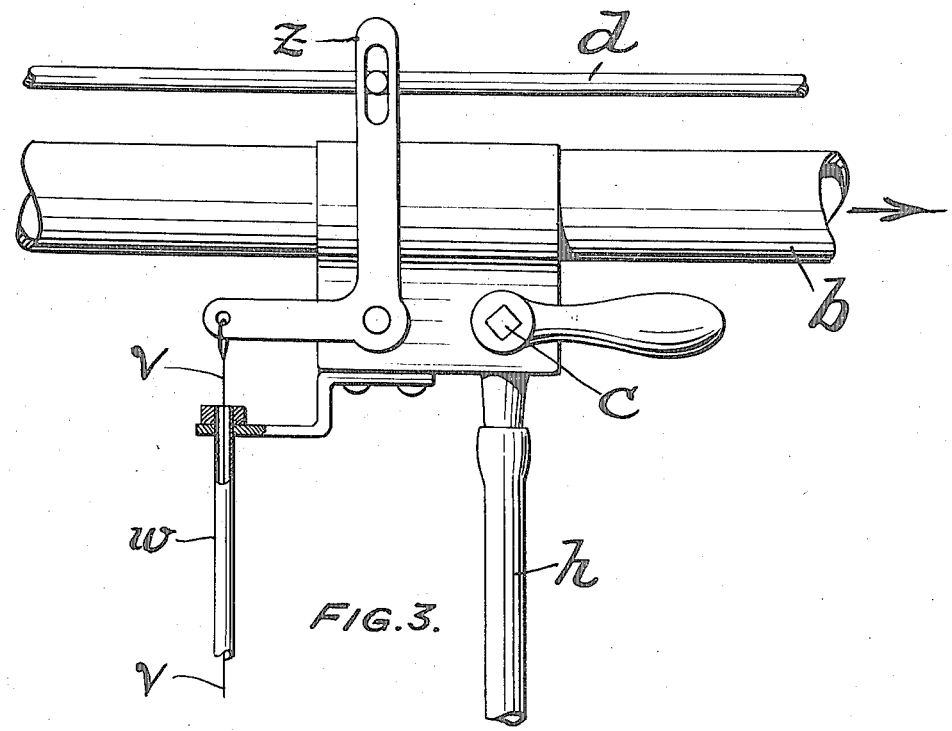

In the accompanying drawings, which show preferred embodiment of the invention: Figure 1 is a diagrammatic view of a complete installation. Fig. 2 is a view, partly in section, of my improved claw containing a pulsator and milk chamber or passage, teat cups connected therewith, a section of the vacuum line, and the means for controlling the operation of the pulsator. Fig. 3 is a side view of modified means for controlling the pulsator. Fig. 4 is a diagrammatic view of a modified complete installation.

Referring to Fig. 1: Extending from the vacuum pump $a$, which is driven by any available motor, not shown, is a vacuum line $b$ that extends from the pump to and through the barn, with cocks $c$ where the cows are to be milked. A drive rod $d$, extending alongside the vacuum line $b$, is reciprocated longitudinally from lever and connecting rod mechanism $e$ actuated from a small pulley $f$ belted conveniently to the drive wheel of the vacuum pump.

A milk pail $g$ is connected to the vacuum pipe $b$ by a flexible tube $h$ and to the milk claw $j$ by a flexible tube $i$. Referring to Fig. 2: The milk claw $j$ is connected to the inner or teat receiving chamber of the teat cup $l$ by a tube $k$. The pulsation claw is shown as attached to the milk claw, but this is not essential. It comprises a two diameter cylinder $m$ and a differential piston and valve $n$ reciprocable therein. The pulsator shown is adapted for alternate pulsation of two pairs of teat cups but other porting may be used for simultaneous pulsation. The cylinder shown is open to the atmosphere at both ends; the center is in communication by a port $o$ with continuous suction; and ports $p$ and $q$, intermediate between the ends and center, communicate with the outer or pulsation chambers of the teat cups $l$. The piston $n$ has a central bore $r$ and branch holes $s$ at the middle of the large portion.

A motor, located between the vacuum pipe line and the pulsator $m$, comprises a cylinder $t$ and a piston $u$. The cylinder is open at its lower end to the atmosphere and at its upper end is connected to a three-way valve $x$, which is adapted to connect the cylinder $t$ with either atmosphere or the vacuum pipe line $b$. The valve is operated to make these connections alternately by means of an arm $y$ having a pin and slot connection with the drive rod $d$. The piston $u$ is connected to one end of a non-extensible wire $v$ that passes through a non-compressible tube $w$ and has its other end connected to the piston valve $n$ in the pulsator. The piston $u$ and the large end of the piston $n$ are both the same size so that the atmospheric pressures acting on them are equal and opposite and may be neglected in considering the operating forces. The relative sizes of the small end of the piston $n$ exposed to atmospheric pressure, of the differential area exposed to vacuum, and of the upper end of the piston $u$ exposed to pulsation, are such that, with a pulsation pipe pressure approximately half way between the full vacuum and atmospheric, the forces will be balanced and the piston $u$ wire $v$ and valve $n$ will remain at rest.

When, in operation, the vacuum pump $a$ exhausts air from the pipe $b$, flexible tube $h$, pail $g$, flexible tube $i$, the milk claw $j$, tubes $k$ and interior of the cups $l$ and also through the port $o$ from the central portion of the pulsator cylinder $m$, reciprocating drive rod $d$ operates the valve $x$ to connect the upper end of the cylinder $t$ alternately with atmosphere and with the vacuum line $b$. When the upper end of the cylinder $t$ is connected with the vacuum line, the piston $u$ will move upward and the piston $n$ to the right, as shown in Fig. 2. Atmospheric pressure will then pass through the port $p$ to the pulsation chambers of two teat cups while the pulsation chambers of the other two teat cups are connected by ports $q$ and $o$ with suction. When the upper end of the cylinder $t$ is connected with atmosphere, the piston $u$ will move downward and the piston $n$ to the left, connecting port $p$ with suction and port $q$, through holes $s$ and central bore $r$, with the atmosphere.

It will be understood that the invention does not depend upon the specific construction of the pulsator valve and the motor, as these may be varied, absolutely or relatively to each other. Other variations will suggest themselves to those skilled in the art.

It is clear that the above construction is one in which comparatively little power is required to operate a large number of machines, there being no pulsation line and no master pulsator. Further, a quick, snappy movement, as distinguished from a slow, gradual movement, is imparted to the pulsator valve, which is advantageous.

The modification shown in Fig. 3 involves a still further simplification. The construction is the same as that of Figs. 1 and 2 except that the upper end of the wire $v$ is connected directly to one arm of a bell-crank lever $z$, the other arm of the lever having a pin and slot connection with the drive rod $d$. The pneumatic motor for operating the piston $n$ is altogether omitted and the operation of the pulsator valve is controlled wholly by mechanical means. This simplification is advantageous, although the pulsator valve is not moved as quickly as in the construction of Figs. 1 and 2.

Still another modification is shown in Fig. 4, in which the construction is the same as in Figs. 1 and 2 with the exception that the upper end of the cylinder $t$ is connected with a pulsation pipe line 10 in which pneumatic pulsations are produced by a master pulsator 11, which conveniently may be located at the vacuum pump $a$, and driven therefrom. The operation is substantially the same as that described for the construction of Figs. 1 and 2, the only difference being in the source of the pneumatic pulsations operating upon the upper surface of the piston $u$.

Having now fully described my invention, what I desire to claim and protect by Letters Patent is:

1. In a milking machine operating system, the combination with a vacuum pipe line, of a set of two-chambered teat cups, pipe connections between the vacuum line and the inner teat cup chambers, pipe connections to the outer teat cup chambers and a pulsation valve adapted to produce pneumatic pulsations therein, a pneumatically actuated motor, a flexible mechanical connection between the motor and the pulsation valve, and means adapted to connect the motor alternately with relatively high and low pneumatic pressure thereby controlling its actuation and, through said flexible mechanical connection, controlling the actuation of the pulsation valve.

2. In a milking machine operating system, the combination with a vacuum pipe line, of a set of two-chambered teat cups, pipe connections between the vacuum line and the inner teat cup chambers, pipe connections to the outer teat cup chambers and a pulsation valve adapted to produce pneumatic pulsations therein, a cylinder, a piston therein, a flexible non-extensible wire connecting said piston and pulsation valve, and means to connect said cylinder alternately with relatively high and low pneumatic pressure, thereby controlling the actuation of said piston and, through said wire, the actuation of the pulsation valve.

3. In a milking machine operating system, the combination with a vacuum pipe line, of a set of two-chambered teat cups, pipe connections between the vacuum line and the inner teat cup chambers, pipe connections to the outer teat cup chambers and a pulsation valve adapted to produce pneumatic pulsations therein, a cylinder, a piston therein, a flexible mechanical connection between said piston and pulsation valve, a drive rod, means to reciprocate the drive rod longitudinally, and means, including a valve, actuated from the drive rod, to connect said cylinder alternately with relatively high and low pneumatic pressure.

4. In a milking machine operating system, the combination with a vacuum pipe line, of a set of double chambered teat cups, pipe connections between the vacuum line and the inner teat cup chambers, a valve chamber, pipe connections between the outer teat cup chambers and the valve chamber, and a reciprocable piston in the valve chamber adapted to produce pneumatic pulsations in the outer teat cup chambers, a cylinder and a piston therein, a flexible non-extensible wire connecting the two pistons, and means adapted to connect one face of the second piston alternately with relatively high and low pneumatic pressure, said pistons having pressure surfaces adjusted relatively to each other so that the connection of the last named face of the second piston alternately with relatively high and low pneumatic pressure will effect reciprocation of the two pistons in unison.

5. In a milking machine operating system, the combination with a vacuum pipe line, of a set of two-chambered teat cups, pipe connections between the vacuum line and the inner teat cup chambers, a pulsation valve chamber, a pulsation valve therein having end heads of different diameters both exposed to atmosphere, the space within the pulsation valve chamber between said heads being in communication with the vacuum line, pipe connections to the outer teat cup chambers adapted to be placed alternately in communication with the atmosphere and with the space between the end heads of the valve by the reciprocation of the latter, a flexible non-extensible wire connected with the larger end head of the pulsation valve, and means to alternately pull said wire and relieve said pull, whereby the pulsator valve is moved in one direction by the unbalanced pressure on its end heads and is moved in the other direction by a pull on the wire overcoming said unbalanced pressure.

In testimony of which invention, I have hereunto set my hand, at city of New York, on this 30th day of January, 1917.

NORMAN JOHN DAYSH.

Witnesses:
 GEO. R. REMINGTON,
 GEO. D. TALLMAN.